US011292440B2

(12) United States Patent
Koshiba et al.

(10) Patent No.: US 11,292,440 B2
(45) Date of Patent: Apr. 5, 2022

(54) AUTOMATIC PARKING CONTROL METHOD AND AUTOMATIC PARKING CONTROL APPARATUS FOR VEHICLES

(71) Applicant: Nissan Motor Co., Ltd., Yokohama (JP)

(72) Inventors: Kenji Koshiba, Kanagawa (JP); Hidemitsu Nakagawara, Kanagawa (JP); Hisahiro Nabeshima, Kanagawa (JP); Yasuhiro Sakurai, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/606,264

(22) PCT Filed: May 22, 2017

(86) PCT No.: PCT/JP2017/018972
§ 371 (c)(1),
(2) Date: Oct. 18, 2019

(87) PCT Pub. No.: WO2018/216054
PCT Pub. Date: Nov. 29, 2018

(65) Prior Publication Data
US 2021/0009091 A1     Jan. 14, 2021

(51) Int. Cl.
*B60T 7/12*          (2006.01)
*B60T 1/00*          (2006.01)
(Continued)

(52) U.S. Cl.
CPC ............... *B60T 7/12* (2013.01); *B60T 1/005* (2013.01); *B60T 17/221* (2013.01);
(Continued)

(58) Field of Classification Search
CPC .......... B60T 7/12; B60T 1/005; B60T 17/221; B60T 2201/10; B60W 30/06;
(Continued)

(56) References Cited

U.S. PATENT DOCUMENTS 6,406,102 B1 *    6/2002    Arnold ..................... B60T 7/042
                                                              303/20
2007/0250242 A1   10/2007   Herges
(Continued)

FOREIGN PATENT DOCUMENTS

| CN | 1626386 A   | 6/2005 |
|----|-------------|--------|
| CN | 102358284 A | 2/2012 |

(Continued)

*Primary Examiner* — Christian Chace
*Assistant Examiner* — Aaron C Smith
(74) *Attorney, Agent, or Firm* — Global IP Counselors, LLP (57) ABSTRACT

An automatic parking control device includes an automatic parking controller that carries out automatic parking control, and a park-by-wire controller in which a park lock is automatically engaged when automatic parking is completed at a target stopping position by the automatic parking control. The park-by-wire controller determines whether a system abnormality would occur, in which the park-by-wire system does not operate normally during the automatic parking control. The automatic parking controller prohibits the starting of the automatic parking control upon determining that the system abnormality would occur before the automatic parking control is started.

5 Claims, 4 Drawing Sheets

(51) Int. Cl.

| | | |
|---|---|---|
| *B60T 17/22* | (2006.01) | |
| *B60W 10/18* | (2012.01) | |
| *B60W 30/06* | (2006.01) | |
| *B60W 50/02* | (2012.01) | |
| *F16H 63/34* | (2006.01) | |
| *B60W 10/02* | (2006.01) | |
| *B60W 10/06* | (2006.01) | |
| *B60W 10/08* | (2006.01) | |
| *B60W 10/10* | (2012.01) | |
| *B60W 10/20* | (2006.01) | |

(52) U.S. Cl.
CPC .......... *B60W 10/182* (2013.01); *B60W 30/06* (2013.01); *B60W 50/0205* (2013.01); *F16H 63/34* (2013.01); *B60T 2201/10* (2013.01); *B60W 10/02* (2013.01); *B60W 10/06* (2013.01); *B60W 10/08* (2013.01); *B60W 10/10* (2013.01); *B60W 10/20* (2013.01)

(58) Field of Classification Search
CPC .......... B60W 10/182; B60W 50/0205; B60W 10/02; B60W 10/10; B60W 10/06; B60W 10/08; B60W 10/20; B60W 50/02; B60W 50/0225; B60W 50/029; B60W 2050/0292; B60W 2050/0295; F16H 63/34
See application file for complete search history.

(56) References Cited

U.S. PATENT DOCUMENTS

| | | | |
|---|---|---|---|
| 2007/0299566 A1* | 12/2007 | Goss | B60T 17/221 |
| | | | 701/70 |
| 2010/0217488 A1 | 8/2010 | Nijakowski et al. | |
| 2013/0046431 A1 | 2/2013 | Becker et al. | |
| 2013/0197734 A1* | 8/2013 | Okura | B60L 50/51 |
| | | | 701/22 |
| 2015/0032323 A1* | 1/2015 | Nijakowski | B60T 8/885 |
| | | | 701/23 |
| 2017/0021828 A1 | 1/2017 | Seo et al. | |
| 2017/0182993 A1* | 6/2017 | Feldmann | B60T 13/74 |
| 2018/0051804 A1* | 2/2018 | Singh | B60T 1/005 |

FOREIGN PATENT DOCUMENTS

| | | | |
|---|---|---|---|
| CN | 104527640 A | | 4/2015 |
| CN | 106352076 A | | 1/2017 |
| DE | 102011004716 A1 | * | 2/2011 |
| DE | 10 2015 206 582 A1 | | 10/2016 |
| JP | 2005-343248 A | | 12/2005 |
| JP | 4814236 B2 | | 9/2011 |
| JP | 2012-66814 A | | 4/2012 |
| JP | 5757893 B2 | | 6/2015 |
| JP | 2015-120403 A | | 7/2015 |
| JP | 2017-62020 A | | 3/2017 |
| KR | 10-137148 B1 | | 3/2014 |
| KR | 10-2017-0011150 A | | 2/2017 |

* cited by examiner

AUTOMATIC PARKING CONTROL METHOD AND AUTOMATIC PARKING CONTROL APPARATUS FOR VEHICLES

CROSS-REFERENCE TO RELATED APPLICATIONS

This application is a U.S. national stage application of International Application No. PCT/JP2017/018972, filed on May 22, 2017.

BACKGROUND

Technical Field

The present disclosure relates to an automatic parking control method and an automatic parking control device for a vehicle that automatically engages park lock when automatic parking is completed at a target stopping position.

Background Information

An automatic parking assistance device that automatically engages park lock when automatic parking is completed at a target stopping position is known from the prior art (for example, refer to Japanese Laid-Open Patent Application No. 2015-120403—Patent Document 1).

SUMMARY

The prior art document described above discloses a technique in which, after the completion of the automatic parking of a vehicle, once the driver has alighted from the vehicle, a vehicle power source is turned off to a state in which the electrical components cannot be used, and in which, if the driver has not alighted from the vehicle, the electrical components are usable. However, the above-described prior art document does not disclose fail-safe control with respect to the occurrence of a system abnormality of a park lock system used in automatic parking control; thus, there is room for analysis.

In view of the problem described above, an object of the present disclosure is to prevent the automatic parking control from being interrupted before its completion due to an abnormality when the occurrence of a system abnormality is determined before the automatic parking control is started.

In order to achieve the object described above, in the present disclosure, a park-by-wire system is provided in which a park lock is automatically engaged when automatic parking is completed at a target stopping position using an automatic parking control. In this automatic parking control method for a vehicle, it is determined whether a system abnormality would occur in which the park-by-wire system does not operate normally during the automatic parking control. Upon determining, before the automatic parking control is started, that a system abnormality would occur, the starting of the automatic parking control is prohibited.

By carrying out fail-safe control of the automatic parking control based on the determination of the occurrence of the system abnormality in this manner, when the occurrence of a system abnormality is determined before automatic parking control is started, it is possible to prevent the automatic parking control from being interrupted before its completion due to the abnormality.

DETAILED DESCRIPTION OF THE EMBODIMENTS

A preferred embodiment for realizing an automatic parking control method and an automatic parking control device for a vehicle according to the present disclosure will be described below based on the first embodiment illustrated in the drawings.

First Embodiment

The configuration is described first. The automatic parking control method and the automatic parking control device according to the first embodiment are applied to an FF hybrid vehicle (one example of a vehicle) provided with an automatic parking control unit as one driving assistance control. An "overall system configuration," a "configuration of park-by-wire system," a "configuration of park-by-wire system failure diagnostic process," and a "configuration of automatic parking control process including fail-safe control" will be separately described below, regarding the configuration of the first embodiment.

Overall System Configuration

Figure 1:
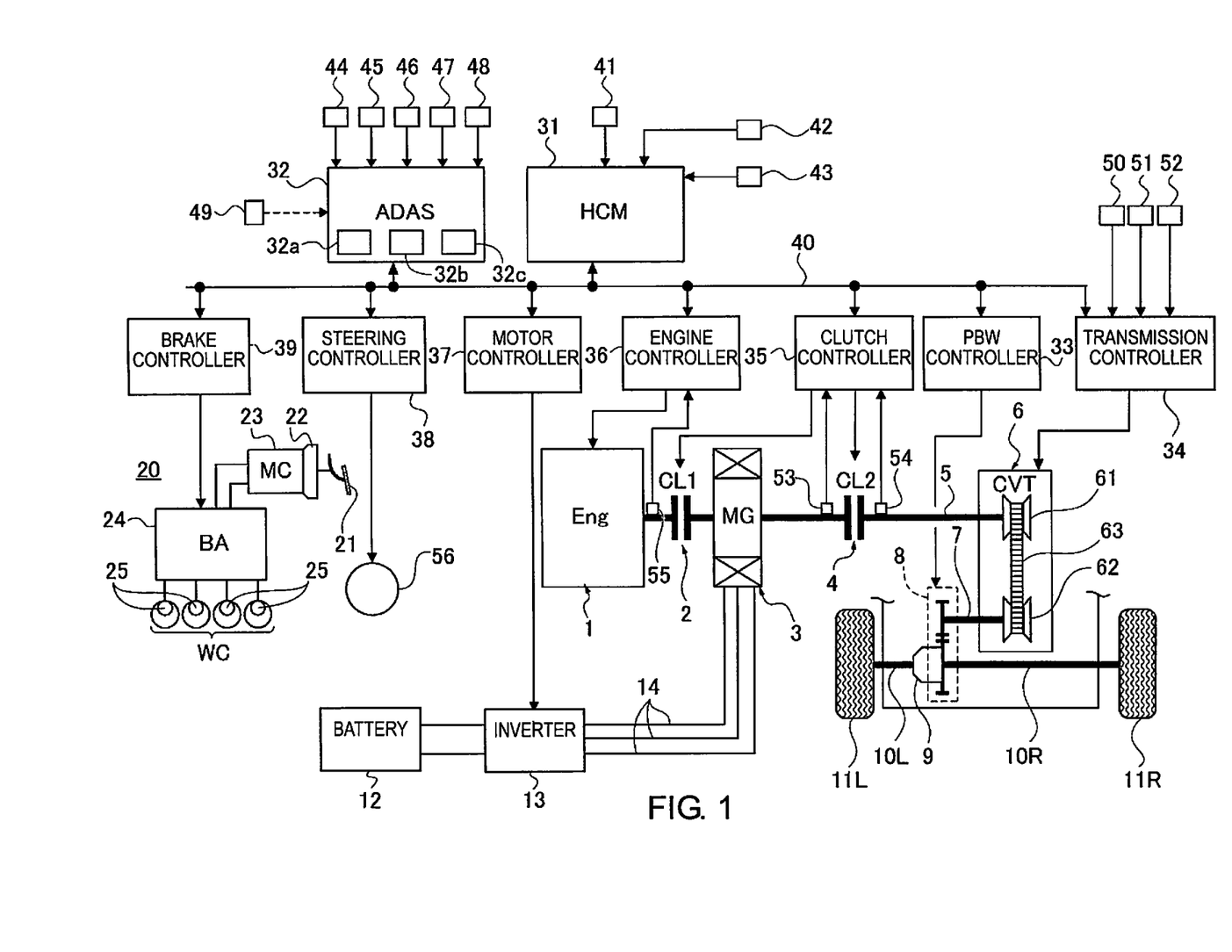
FIG. 1 is an overall system view illustrating an FF hybrid vehicle (one example of a vehicle) to which is applied an automatic parking control method and an automatic parking control device according to a first embodiment.

FIG. 1 illustrates an overall system of an FF hybrid vehicle to which is applied the automatic parking control method and the automatic parking control device according to the first embodiment. The overall system configuration of the FF hybrid vehicle will be described below, with reference to FIG. 1.

As illustrated in FIG. 1, a drive system of the FF hybrid vehicle comprises an engine 1 (Eng), a first clutch 2 (CL1), a motor/generator 3 (MG), a second clutch 4 (CL2), a transmission input shaft 5, and a belt-type continuously variable transmission 6 (abbreviated as "CVT"). A transmission output shaft 7 of the belt-type continuously variable transmission 6 is drivingly coupled to right and left front wheels 11R, 11L, via a final reduction gear train 8, a front differential gear 9, and right and left front wheel drive shafts 10R, 10L.

The first clutch 2 is a hydraulically actuated normally-open dry multi-plate clutch which is interposed between the engine 1 and the motor/generator 3, in which complete engagement/slip engagement/disengagement are controlled by means of a first clutch hydraulic pressure.

The motor/generator 3 is a three-phase alternating current permanent magnet type synchronous motor which is coupled to the engine 1 via the first clutch 2. The motor/generator 3 uses a high-power battery 12 as a power source, and an inverter 13 that converts direct current to three-phase alternating current during powering and three-phase alternating current to direct current during regeneration is connected to a stator coil via an AC harness 14.

The second clutch 4 is a hydraulically actuated wet multi-plate friction clutch which is interposed between the motor/generator 3 and the right and left front wheels 11R, 11L, which are drive wheels, in which complete engagement/slip engagement/disengagement are controlled by means of a second clutch hydraulic pressure. The second clutch 4 of the first embodiment is configured by utilizing a forward clutch and a reverse brake provided in a forward/reverse switching mechanism of the belt-type continuously variable transmission 6 using planetary gears. That is, the forward clutch is used as the second clutch 4 (CL2) during forward travel, and the reverse brake is used as the second clutch 4 (CL2) during reverse travel.

The belt-type continuously variable transmission 6 is composed of a primary pulley 61, a secondary pulley 62, and a belt 63 that is wound around both the pulleys 61, 62. The belt-type continuously variable transmission realizes a stepless transmission ratio by changing the winding diameter of the belt by shifting the hydraulic pressure applied to a belt primary oil chamber and a secondary oil chamber.

The first clutch 2, the motor/generator 3, and the second clutch 4 constitute a one-motor two-clutch drive system, and an "EV mode" and an "HEV mode" are provided as the main drive modes of this drive system. The "EV mode" is an electric vehicle mode having only the motor/generator 3 as the drive source in which the first clutch 2 is released and the second clutch 4 is engaged, and travel by means of "EV mode" is referred to as "EV travel." The "HEV mode" is a hybrid vehicle mode having the engine 1 and the motor/generator 3 as drive sources in which both of the clutches 2, 4 are engaged, and travel by means of this "HEV mode" is referred to as "HEV travel."

A hydraulic brake system will now be described. The hydraulic brake system 20 includes a brake pedal 21, a negative pressure booster 22, a master cylinder 23, a brake fluid pressure actuator 24, and a wheel cylinder 25. When there is a braking operation, the wheel cylinder pressures of the four wheels are independently controlled based on the master cylinder pressure. On the other hand, when there is no braking operation, the wheel cylinder pressures of the four wheels are independently controlled based on pump pressure from an electric oil pump that is operated in accordance with an external control command. The brake fluid pressure actuator 24 is composed of the electric oil pump and pressure-reducing and pressure-increasing solenoids provided on each of the four wheels. The wheel cylinder 25 is provided at each tire position of the right and left front wheels 11R, 11L and the right and left rear wheels, not shown.

At the time of a braking operation, the hydraulic brake system 20 carries out a cooperative brake control of the regeneration amount/fluid pressure amount, such that an amount obtained by subtracting a coast regeneration amount and a brake cooperative regeneration amount from a target driver deceleration driving force, which is based on a pedal operation amount, is allotted to a hydraulic braking force (mechanical brake). In addition to the foregoing, the hydraulic brake system has various functions requiring brake fluid pressure control, such as ABS function, TCS function, VDC function, automatic braking function, cruise control braking function, braking function under automatic parking control, etc.

As illustrated in FIG. 1, the control system of the FF hybrid vehicle includes a hybrid control module 31 (HCM) and a driving assistance control unit 32 (ADAS). A PBW controller 33, a transmission controller 34, a clutch controller 35, an engine controller 36, a motor controller 37, a steering controller 38, and a brake controller 39 are provided in addition to these control devices. These control devices including the hybrid control module 31 are connected by means of a CAN communication line 40 (CAN is an acronym for "Controller Area Network") so as to be capable of bidirectional information exchange.

The hybrid control module 31 (HCM: acronym for "Hybrid Control Module") is an integrated control device having the function of appropriately managing the energy consumption of the entire vehicle. The hybrid control module 31 inputs information from a regeneration mode selection switch 41, an accelerator opening degree sensor 42, a vehicle speed sensor 43, and the like. The various controls are then carried out based on the input information, such as mode transition control between the "EV mode" and the "HEV mode," and a regeneration mode selection control.

The driving assistance control unit 32 (ADAS: acronym for "Advanced Driver Assistance System") is a control device for assisting the driving operation by a driver. This driving assistance control unit 32 inputs information from an onboard camera 44, an onboard radar 45, a cruise travel selection switch 46, an automatic brake selection switch 47, a manned automatic parking mode selection switch 48, an unmanned automatic parking mode selection switch 49, and the like. The onboard camera 44 and the onboard radar 45 are recognition sensors for recognizing the surrounding environment of a host vehicle, such as a preceding vehicle, a following vehicle, and an obstacle on the road. The automatic brake selection switch 47, the cruise travel selection switch 46, and the manned automatic parking mode selection switch 48 are switches provided in the cabin interior and operated by the driver in the vehicle. The unmanned automatic parking mode selection switch 49 is a switch provided on a wireless portable terminal and is operated by the driver who has alighted and is away from the vehicle.

The driving assistance control unit 32 includes, as controllers that exhibit a driving assistance control function, a cruise control unit 32a, an emergency brake control unit 32b, and an automatic parking control unit 32c.

When the cruise travel selection switch 46 is turned ON during travel, the cruise control unit 32a maintains a set vehicle speed if there is no preceding vehicle while the switch is ON, and maintains an appropriate inter-vehicular distance if there is a preceding vehicle, carrying out a preceding vehicle follow control for following the preceding vehicle by means of deceleration or acceleration.

If the automatic brake selection switch 47 is kept ON, the emergency brake control unit 32b detects pedestrians and vehicles ahead, and carries out an emergency control by using an alarm or an automatic brake (a slow brake, an emergency brake) when there is the risk of collision.

When the driver turns the manned automatic parking mode selection switch 48 ON, the automatic parking control unit 32c carries out an automatic parking area parking control, in which a manned travel is carried out along a target parking area parking path area from the current position to a target stopping position, and park lock is automatically engaged when the automatic parking is completed at the target stopping position. In addition, if the unmanned automatic parking mode selection switch 49 is turned ON for parking area parking at the entrance of a parking lot, etc., an automatic parking area parking control is carried out in which unmanned travel is carried out along the target parking area parking path from the current position to the target stopping position, and park lock is automatically engaged when the automatic parking is completed at the target stopping position. If the unmanned automatic parking mode selection switch 49 is turned ON for parking area exiting, an automatic parking area exiting control is carried out in which the parked vehicle is called to a target stopping position along a target parking area exiting path; and a park lock is automatically engaged when the automatic parking is completed at the target stopping position. The automatic parking control unit 32c takes in the result of failure diagnosis of a park-by-wire system A from the PBW controller 33 as fail-safe control information in the automatic parking control.

The PBW controller 33 inputs a park lock command and a park lock release command from the automatic parking control unit 32c or a transmission controller 34. Then, the controller calculates a park lock execution command and a park lock release execution command for a park actuator 71 (refer to FIG. 2) of the park-by-wire system A. The PBW controller 33 has a function of diagnosing failures of the park-by-wire system A.

The transmission controller 34 inputs information from an inhibitor switch 50, a transmission input rotational speed sensor 51, a transmission output rotational speed sensor 52, and the like, and carries out shifting hydraulic pressure control of the belt-type continuously variable transmission 6, and the like. When a P range position signal is input from the inhibitor switch 50, which detects the selected range position, the transmission controller 34 outputs the park lock command to the PBW controller 33. When a range position signal other than the P range position signal is input from the inhibitor switch 50, the park lock release command is output to the PBW controller 33.

The clutch controller 35 inputs information from the hybrid control module 31, a second clutch input rotational speed sensor 53, a second clutch output rotational speed sensor 54, and the like, and carries out engagement hydraulic pressure control of the first clutch 2 (CL1) and the second clutch 4 (CL2).

The engine controller 36 inputs information from the hybrid control module 31, an engine rotational speed sensor 55, and the like, and carries out a fuel injection control, an ignition control, a fuel cut control, and the like of the engine 1.

The motor controller 37 carries out a powering control, a regenerative control, etc., of the motor/generator 3 by means of an inverter 13 based on a command from the hybrid control module 31.

When the automatic parking area parking control or the automatic parking area exiting control is selected in the automatic parking control unit 32c, the steering controller 38 calculates an actuator operation command based on a required steering angle from the automatic parking control unit 32c. The actuator operation command is then output from the steering controller 38 to a steering actuator 56 to automatically control the steering angle of the steering wheel.

The brake controller 39 outputs a control command to the brake fluid pressure actuator 24 to establish the required hydraulic pressure based on the required brake fluid pressure from the hybrid control module 31 and the driving assistance control unit 32.

Configuration of the Parking Control System

Figure 2:
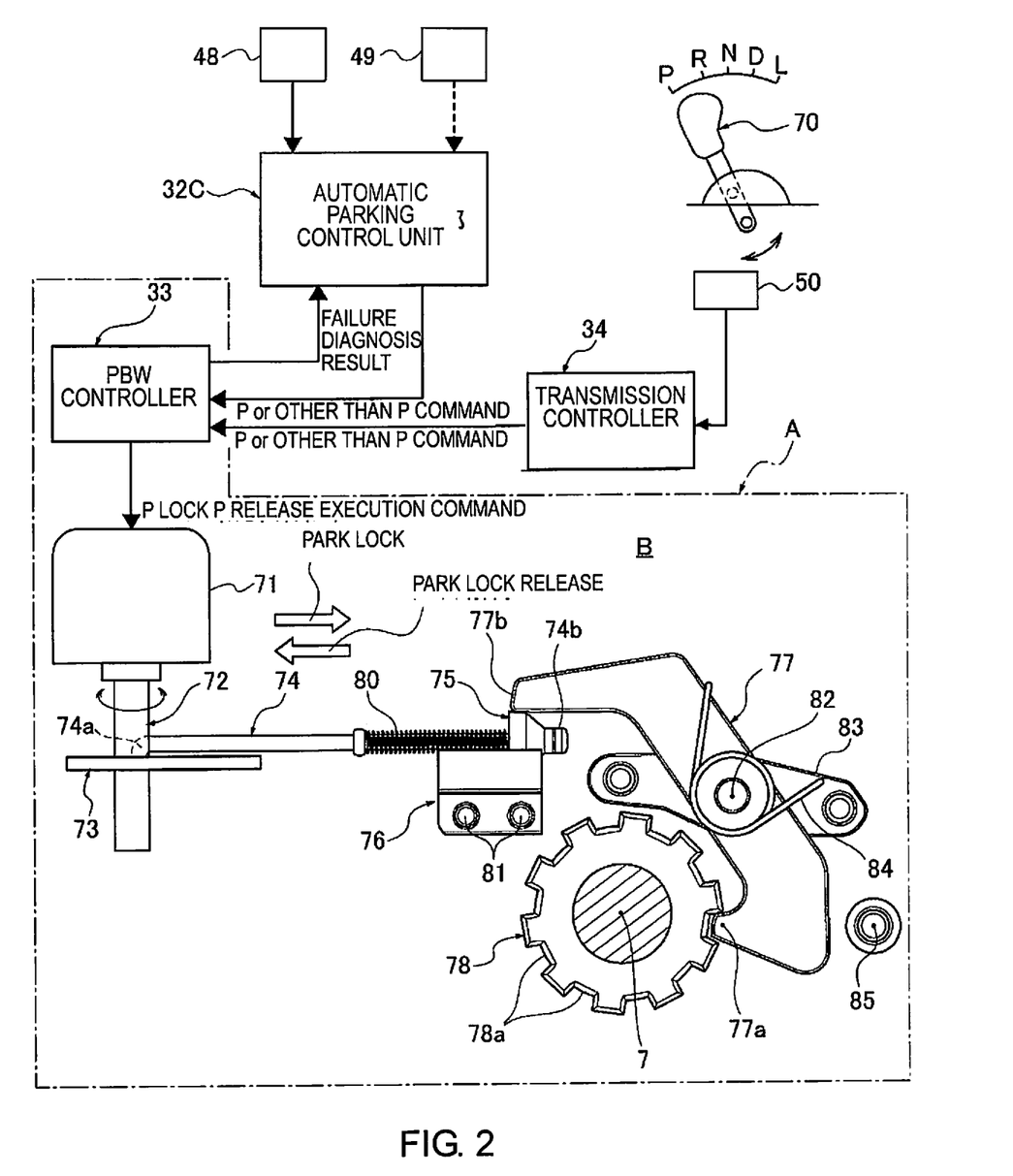
FIG. 2 is a block diagram of a parking control system illustrating the parking control system provided with a park-by-wire system that automatically engages a park lock when the automatic parking is completed in the automatic parking control.

FIG. 2 illustrates a parking control system provided with the park-by-wire system A that automatically engages the park lock when automatic parking is completed in the automatic parking control. The configuration of the parking control system will be described below with reference to FIG. 2.

As illustrated in FIG. 2, the parking control system includes the automatic parking control unit 32c, the manned automatic parking mode selection switch 48, the unmanned automatic parking mode selection switch 49, a select lever 70, the inhibitor switch 50, the transmission controller 34, and the park-by-wire system A. The park-by-wire system A is composed of the PBW controller 33, the park actuator 71, and a park lock mechanism B. That is, the park-by-wire system A is a system in which the select lever 70 and the park lock mechanism B are not mechanically coupled, and the park lock mechanism B is operated by means of the park actuator 71.

The automatic parking control unit 32c inputs the result of a failure diagnosis from the PBW controller 33. Then, during automatic parking control with the manned automatic parking mode selection switch 48 or unmanned automatic parking mode selection switch 49 turned ON, the park lock release command is output to the PBW controller 33 until the automatic parking at the target stopping position is completed. Then, when the automatic parking at the target stopping position is completed, the park lock command is output to the PBW controller 33.

When the automatic parking control is turned OFF, the transmission controller 34 outputs the park lock release command to the PBW controller 33 while a range position other than the P range position is selected with the select lever 70. Then, when the driver operates the select lever 70 to select the P range position, the park lock command is output to the PBW controller 33.

When the park lock command is input from the automatic parking control unit 32c or the transmission controller 34, the PBW controller 33 outputs the park lock execution command to the park actuator 71. Then, when the park lock release command is input from the automatic parking control unit 32c or the transmission controller 34, the park lock release execution command is output to the park actuator 71. In addition, the PBW controller 33 carries out failure diagnosis in which motor operation environment and motor operation state of the electric motor of the park actuator 71 are monitored, and it is determined whether failure has occurred in the park-by-wire system.

The park actuator 71 uses an electric motor that rotates in one direction when the park lock execution command from the PBW controller 33 is received and rotates in the reverse direction when the park lock release execution command from the PBW controller 33 is received.

The park lock mechanism B includes a motor shaft 72 of the park actuator 71, a detent plate 73, a parking rod 74, a wedge 75, a support member 76, a parking pawl 77, and a parking gear 78.

The parking rod 74 is a rod member in which one end portion 74a is connected to the detent plate 73 that is fixed to the motor shaft 72, and the other end portion 74b extends toward the a parking pawl 77. The one end portion 74a of the parking rod 74 is inserted into a hole formed in the detent plate 73 so as to be rotatable, and the other end portion 74b is configured as a large-diameter portion so as to exhibit a stopper function for restricting the movement of the wedge 75.

The wedge 75 is a waiting function member that is attached to an inner position of the other end portion 74b of the parking rod 74 so as to be movable. This wedge 75 is provided with a through-hole formed at the central axis position and is made movable by insertion of the parking rod 74 into the through-hole. In addition, a coil spring 80 applies a biasing force to the wedge 75 in the direction in which the wedge comes into contact with the other end portion 74b of the parking rod 74. Then, at the time of park lock engagement, the engagement between the a parking pawl 77 and the parking gear 78 is maintained by bringing the other end portion 77b of the a parking pawl 77 is brought into contact with and supported by the wedge 75.

The support member 76 is fixed at a position where the wedge 75 is disposed and guides and supports a surface of the wedge 75 on the opposite side of the surface with which the other end portion 77b of the a parking pawl 77 comes into contact so as to be linearly movable. This support member 76 is fixed to a case member by means of a bolt 81.

The a parking pawl 77 is provided so as to be pivotable with respect to the case member via a pole pin 82. One end portion of the a parking pawl 77 has a fitting pawl 77a that engages with tooth recesses 78a of the parking gear 78. The other end portion 77b of the a parking pawl 77 has an arcuate surface shape for making contact with the wedge 75. A spring 84, the biasing force of which acts in a direction to increase the contact force between the wedge 75 and the other end portion 77b of the a parking pawl 77, is provided between the a parking pawl 77 and a pin support bracket 83. A stopper pin 85 that restricts the maximum displacement angle in a state in which the engagement of the a parking pawl 77 with the parking gear 78 has been released is fixed to the case member at an outer peripheral position of one end of the a parking pawl 77. The parking gear 78 is provided on, for example, a gear shaft of the transmission output shaft 7 or the final reduction gear train 8.

The park lock mechanism B operates as follows. When the park actuator 71 rotates in one direction when the park lock execution command from the PBW controller 33 is received, the parking rod 74 moves to the right in FIG. 2, and the a parking pawl 77 engages the parking gear 78, entering a park lock state. When the park actuator 71 rotates in the reverse direction when the park lock release execution command from the PBW controller 33 is received, the parking rod 74 moves to the left in FIG. 2, and the a parking pawl 77 disengages from the parking gear 78, entering a park lock release state.

Configuration of Park-By-Wire System Failure Diagnostic Process

Figure 3:
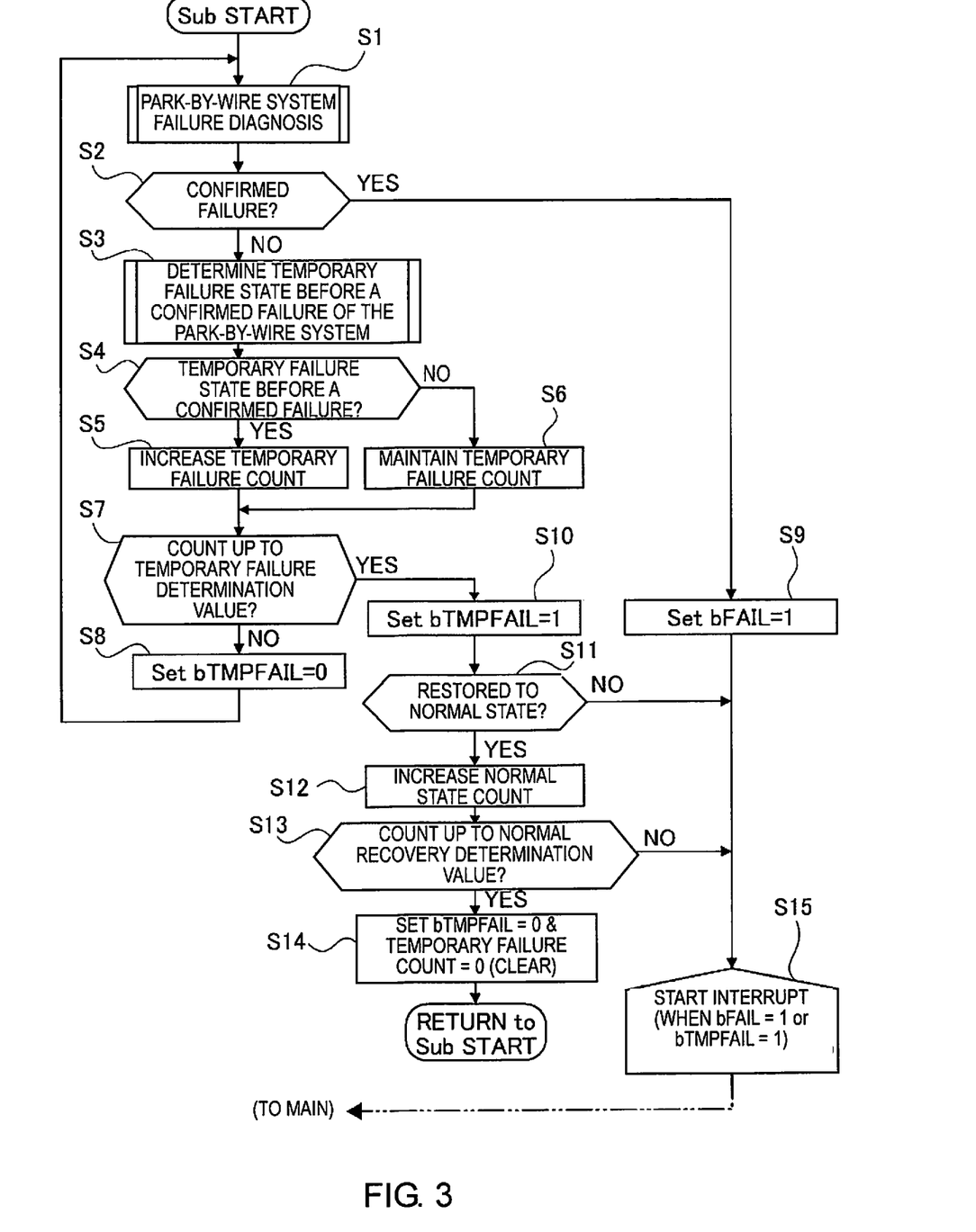
FIG. 3 is a flow chart of a subroutine illustrating the flow of a failure diagnostic process of the park-by-wire system executed by a PBW controller according to the first embodiment.

FIG. 3 is a flow chart of a subroutine illustrating the flow of a failure diagnostic process of the park-by-wire system A executed by a PBW controller 22 according to the first embodiment. Each of the steps in FIG. 3, which represent the configuration of the park-by-wire system A failure diagnostic process will be described below. The flow chart of FIG. 3 is constantly executed, from ignition on to off.

In Step S1, following START or setting of bTMPFAIL=0 in Step S8, the park-by-wire system A failure diagnostic process for determining a failure in which the park-by-wire system A becomes unable to engage the park lock is executed, and the process proceeds to Step S2.

Here, in the park-by-wire system A having the failure diagnostic processing unit, the types of diagnosable failures in which the park-by-wire system A becomes unable to engage the park lock include such abnormalities (confirmed failure) that would not be resolved with the passage of time, such as a mechanical abnormalities or disconnection/short-circuit failures of the park actuator 71. In addition, motor voltage/motor current, etc., which can be applied to the motor are monitored based on the motor temperature and the battery capacity/temperature, and temporary failures that would be resolved with the passage of time are diagnosed. When a temporary failure is diagnosed, a motor voltage determination threshold/motor current determination threshold for the temporary failure may be provided as a fixed value or as a variable value in accordance with load resistance that is applied to the park actuator 71 due to the road surface gradient or the like.

In Step S2, following the park-by-wire system failure diagnosis in Step S1, it is determined whether the failure of the park-by-wire system A is confirmed. If YES (confirmed failure), the process proceeds to Step S9, and if NO (unconfirmed failure), the process proceeds to Step S3. Here, in the case of an abnormal failure that would not be resolved with the passage of time, such as mechanical abnormalities or disconnection/short-circuit failures of the park actuator 71, failure is confirmed and the process proceeds to Step S9; otherwise the process proceeds to Step S3.

In Step S3, following the determination that the failure is unconfirmed in Step S2, a temporary failure state before a confirmed failure of the park-by-wire system A is determined, and the process proceeds to Step S4. Here, a temporary failure state before a confirmed failure is a failure that would be resolved with the passage of time, from among the failures in which the park-by-wire system A becomes unable to engage the park lock.

In Step S4, following the determination of the temporary failure state before a confirmed failure of the park-by-wire system in Step S3, it is determined whether it is the temporary failure state before a confirmed failure. If YES (temporary failure state), the process proceeds to Step S5, and if NO (normal state), the process proceeds to Step S6.

In Step S5, following the determination that it is the temporary failure state in Step S4, a temporary failure count value is increased, and the process proceeds to Step S7.

In Step S6, following the determination that it is the normal state in Step S4, the temporary failure count value is maintained, and the process proceeds to Step S7.

In Step S7, following the increase in the temporary failure count value in Step S5 or the maintaining of the temporary failure count value in Step S6, it is determined whether the temporary failure count value has reached a failure determination threshold. If YES (temporary failure count value≥failure determination threshold), the process proceeds to Step S10, and if NO (temporary failure count value<failure determination threshold), the process proceeds to Step S8.

In Step S8, following the determination that temporary failure count value<failure determination threshold in Step S7, a temporary failure determination flag (bTMPFAIL) is set to bTMPFAIL=0, and the process returns to Step S1.

In Step S9, following the determination that it is a confirmed failure in Step S2, a confirmed failure flag (bFAIL) of the park-by-wire system A is set to bFAIL=1, and the process proceeds to Step S15.

In Step S10, following the determination that temporary failure count value ≥failure determination threshold in Step S7, the temporary failure determination flag (bTMPFAIL) is set to bTMPFAIL=1, and the process proceeds to Step S11.

In Step S11, following the setting of the bTMPFAIL=1 in Step S10, it is determined whether the park-by-wire system A has recovered to the normal state. If YES (recovered to normal state), the process proceeds to Step S12, and if NO (temporary failure state), the process proceeds to Step S15.

In Step S12, following a recovery to the normal state is determined in Step S11, a normal state recovery count value is increased, and the process proceeds to Step S13.

In Step S13, following the increase in the normal state recovery count value in Step S12, it is determined whether the normal state recovery count value has reached a normal recovery determination threshold. If YES (normal state recovery count value≥normal recovery determination threshold), the process proceeds to Step S14, and if NO (normal state recovery count value<normal recovery determination threshold), the process proceeds to Step S15.

In Step S14, following the determination that normal state recovery count value≥normal recovery determination threshold in Step S13, the temporary failure determination flag (bTMPFAIL) is set to bTMPFAIL=0, the temporary failure count value is cleared, and the process proceeds to RETURN.

Figure 4:
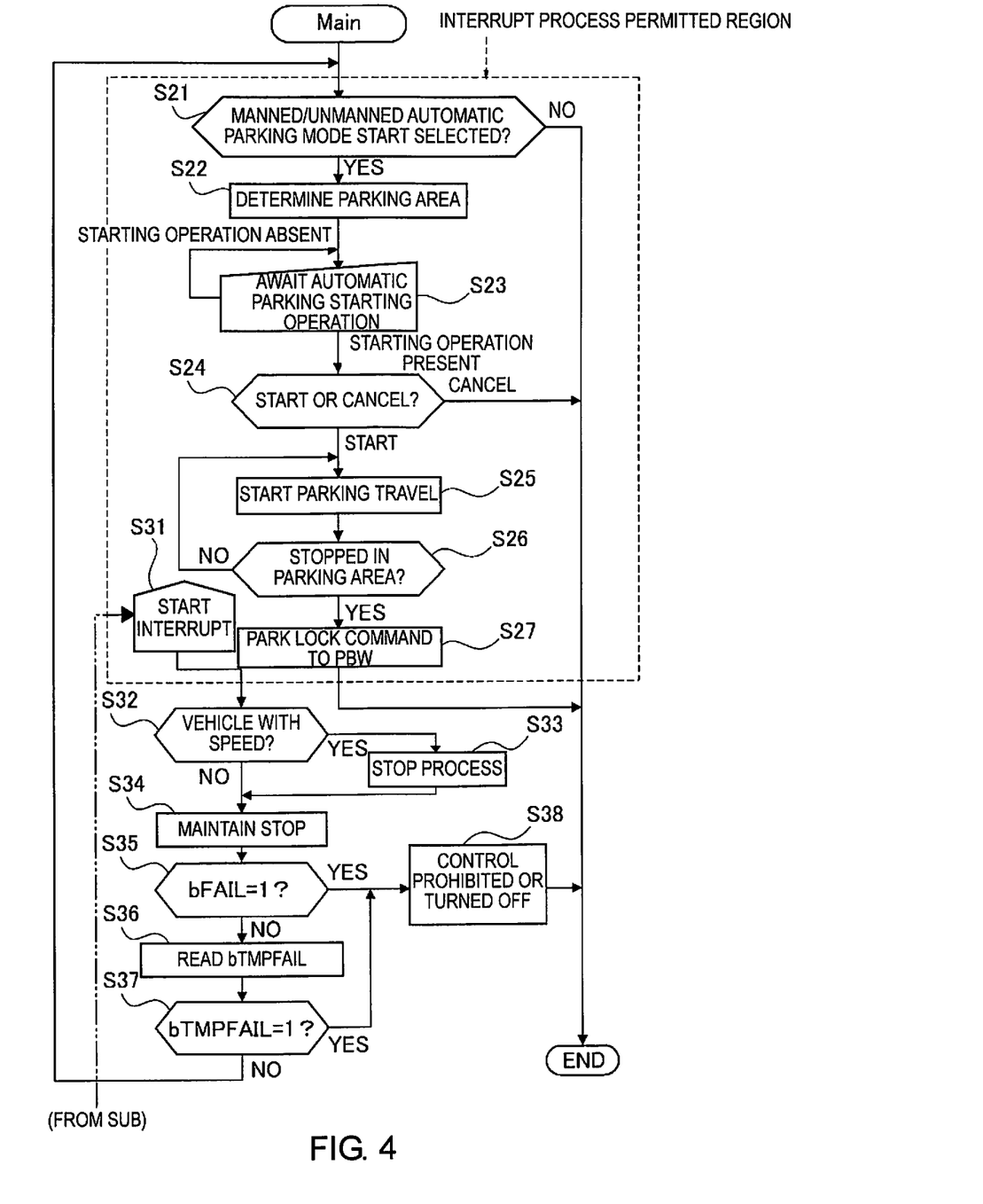
FIG. 4 is a flow chart of a main routine illustrating the flow of the automatic parking control process using an interrupt fail-safe control that is executed by the automatic parking control unit according to the first embodiment.

In Step S15, following the setting of b=1 in Step S9, the determination that it is the temporary failure state in Step S11, or the determination that normal state recovery count value<normal recovery determination threshold in Step S13, an interrupt to the main routine flow chart shown in FIG. 4 is initiated. That is, when the confirmed failure flag bFAIL=1 is set, or the temporary failure determination flag bTMPFAIL=1 is set in the failure diagnostic process of the park-by-wire system A in FIG. 3, an interrupt to the main routine shown in FIG. 4 is initiated.

Configuration of the Automatic Parking Control Process Using Interrupt Fail-Safe Control FIG. 4 illustrates the flow of an automatic parking control process by means of interrupt fail-safe control executed by the automatic parking control unit 32c according to the first embodiment. Each of the steps in FIG. 4, which represent the configuration of the automatic parking control process by means of interrupt fail-safe control will be described below. The flow chart of FIG. 4 is executed when a start condition (automatic parking mode start selected) is satisfied.

In Step S21, following START or a determination that bTMPFAIL=0 in Step S37, it is determined whether the starting of manned/unmanned automatic parking mode has been selected by means of an operation of the manned automatic parking mode selection switch 48 or the unmanned automatic parking mode selection switch 49. If YES (automatic parking mode start selected), the process proceeds to Step S22, and if NO (automatic parking mode start not selected), the process proceeds to END. Here, the starting of the manned automatic parking mode means starting the automatic parking area parking control or the automatic parking area exiting control with the driver in the vehicle by means of an operation of the manned automatic parking mode selection switch 48. The starting of the unmanned automatic parking mode means starting the automatic parking area parking control or the automatic parking area exiting control with the driver out of the car by means of an operation of the unmanned automatic parking mode selection switch 49.

In Step S22, following the determination that the automatic parking mode start has been selected in Step S21, a parking area is determined, and the process proceeds to Step S23. Here, the determination of the parking area means determining the parking area in which a host vehicle is scheduled to be parked in the case of the automatic parking area parking control and determining the area in which the host vehicle is temporarily stopped after the host vehicle has exited the parking position in the case of the automatic parking area exiting control.

In Step S23, following the determination of the parking area in Step S22, a starting operation for automatic parking is awaited, and when the starting operation occurs, the process proceeds to Step S24. Here, the occurrence of the starting operation for automatic parking means that conditions for start manned travel/unmanned travel toward the parking area are satisfied.

In Step S24, following the determination that there is a starting operation for automatic parking in Step S23, it is determined whether to start or cancel the automatic parking. If automatic parking is to be started, the process proceeds to Step S25, and if the automatic parking is to be canceled, the process proceeds to END.

In Step S25, following a determination to start the automatic parking in Step S24, or a determination that the vehicle is not stopped in the parking area in Step S26, parking travel is started and the process proceeds to Step S26.

In Step S26, following the start of parking travel in Step S25, it is determined whether the vehicle is stopped in the parking area. If YES (vehicle stopped in parking area), the process proceeds to Step S27, and if NO (vehicle not stopped in parking area), the process returns to Step S25.

In Step S27, following the determination that the vehicle is parked in the parking area in Step S26, the park lock command is output to the PBW controller 33, and the process proceeds to END.

In Step S31, the time period from before the determination that the manned/unmanned automatic parking mode start has been selected in Step S21 until the park lock command is output in Step S27 is set as an interrupt process permitted region, the interrupt is started, and the process proceeds to Step S32.

In Step S32, following the start of the interrupt in Step S31, it is determined whether the host vehicle has a vehicle speed. If YES (vehicle speed), the process proceeds to Step S33, and if NO (no vehicle speed), the process proceeds to Step S34.

In Step S33, following the determination of vehicle speed Step S32, a stopping process to actuate the hydraulic brake is carried out, and the process proceeds to Step S34.

In Step S34, following the determination of no vehicle speed in Step S32 or following the stopping process in Step S33, the stopped state of the host vehicle is maintained, and the process proceeds to Step S35. In summary, when the confirmed failure flag bFAIL or the temporary failure determination flag bTMPFAIL is set to 1 at the time of the interrupt, if the host vehicle is in the stopped state, the stopped state is maintained, and if the host vehicle is in the travel state, the vehicle is stopped by means of automatic braking.

In Step S35, following the maintaining of the stopped state in Step S34, it is determined whether the confirmed failure flag bFAIL satisfies bFAIL=1. If YES (bFAIL=1), the process proceeds to Step S38, and if NO (bFAIL=0), the process proceeds to Step S36.

In Step S36, following the determination that bFAIL=0 in Step S35, the temporary failure determination flag bTMPFAIL is read and the process proceeds to Step S37.

In Step S37, following the reading of the temporary failure determination flag bTMPFAIL in Step S36, it is determined whether the temporary failure determination flag bTMPFAIL satisfies bTMPFAIL=1. If YES (bTMPFAIL=1), the process proceeds to Step S38, and if NO (bTMPFAIL=0), the process returns to Step S21.

In Step S38, following the determination that bFAIL=1 in Step S35 or the determination that bTMPFAIL=1 in Step S37, the automatic parking control is prohibited or turned off, and the process proceeds to END. That is, the starting of manned/unmanned automatic parking control is prohibited prior to the selection of the manned/unmanned automatic parking mode start. After the manned/unmanned automatic parking mode start is selected but before the park lock command is output, the manned/unmanned automatic parking control is turned off.

The actions are described next. "Action of the failure diagnostic process," "action of the automatic parking control process," "action of the automatic parking control," and "characteristic action of the automatic parking control" will be described separately regarding the actions of the first embodiment.

Action of the Failure Diagnostic Process

First, the action of the failure diagnostic process of the park-by-wire system A will be described based on the flow chart of FIG. 3.

If the park-by-wire system A is in the normal state, the flow that proceeds from Step S1→Step S2→Step S3→Step S4→Step S6→Step S7→Step S8 in the flow chart of FIG. 3 is repeated. Thus, the confirmed failure flag bFAIL and the temporary failure determination flag bTMPFAIL remain set to 0.

If it is diagnosed that the park actuator 71 has an abnormality that would not be resolved with the passage of time (confirmed failure), such as a mechanical abnormality or a disconnection/short-circuit failure, the process proceeds from Step S1→Step S2→Step S9→Step S15 in the flow chart of FIG. 3. In Step S9, the confirmed failure flag (bFAIL) of the park-by-wire system A is set to bFAIL=1. In Step S15, based on the fact that bFAIL=1 is set in Step S9, the interrupt to the main routine flow chart shown in FIG. 4 is started.

Therefore, if the park-by-wire system A is diagnosed to have an abnormality that would not be resolved with the passage of time (confirmed failure), bFAIL=1 is set. For this reason, fail-safe measures are taken immediately by prohibiting the automatic parking control or turning the control off, by means of the interrupt to the main routine shown in FIG. 4.

The flow for the diagnosis of an abnormality that would be resolved with the passage of time (temporary failure) due to an increase in motor temperature or the battery temperature of the park actuator 71, or the like, will be described. If a temporary failure is diagnosed, while it is determined that temporary failure count value<failure determination threshold, a flow that proceeds from Step S1→Step S2→Step S3→Step S4→Step S5→Step S7→Step S8 in the flow chart of FIG. 3 is repeated. That is, the temporary failure determination flag bTMPFAIL remains set to 0.

Then, if temporary failure count value≥failure determination threshold is determined in Step S7 with the passage of time from the start of the temporary failure diagnosis, the process proceeds from Step S7 to Step S10, and in Step S10 the temporary failure determination flag (bTMPFAIL) is set to bTMPFAIL=1. Thereafter, if the normal state is not restored, the process proceeds from Step S11 to Step S15. In Step S15, based on the fact that bTMPFAIL=1 is set in Step S10, an interrupt to the main routine flow chart shown in FIG. 4 is initiated.

Therefore, if the park-by-wire system A is diagnosed with a temporary failure and the temporary failure is maintained for a prescribed period of time, bTMPFAIL=1 is set. Therefore, automatic parking control is permitted for a park-by-wire system A diagnosed with a temporary failure until a prescribed period of time has elapsed. However, once the prescribed period of time for the park-by-wire system A diagnosed with a temporary failure has elapsed, fail-safe measures are taken by prohibiting automatic parking control or turning the control off, by means of the interrupt to the main routine shown in FIG. 4.

Then, even when the normal state is restored after bTMPFAIL=1 is set, while it is determined that normal state recovery count value<normal recovery determination threshold, the process proceeds from Step S10 to Step S11→Step S12→Step S13→Step S15. For this reason, fail-safe measures are taken by means of the interrupt to the main routine shown in FIG. 4.

On the other hand, when the normal state is restored after bTMPFAIL=1 is set and it is determined that normal state recovery count value≥normal recovery determination threshold, the process proceeds from Step S10 to Step S11→Step S12→Step S13→Step S14→RETURN. That is, in Step S14, the temporary failure count value is cleared and the initial state is restored by the temporary failure determination flag (bTMPFAIL) being rewritten from bTMPFAIL=1 to bTMPFAIL=0.

Therefore, even if the park-by-wire system A is diagnosed as a temporary failure and bTMPFAIL=1 is set, when it is confirmed that the park-by-wire system A has been restored to the normal state, bTMPFAIL=1 is overwritten to bTMPFAIL=0. For this reason, the automatic parking control, which has been prohibited or turned off, is restored to the normal automatic parking control by means of the interrupt to the main routine shown in FIG. 4.

Action of the Automatic Parking Control Process

The action of the automatic parking control process by means of the interrupt fail-safe control will now be described based on the flow chart of FIG. 4.

When the start of the manned/unmanned automatic parking mode is selected and there is no interrupt process from the subroutine, the process proceeds from Step S21→Step S22→Step S23 in the flow chart of FIG. 4. In Step S22, the parking area is determined, and in the next Step S23, the starting operation for automatic parking is awaited. Then, when the conditions to start manned travel/unmanned travel toward the parking area are satisfied and the automatic parking control is started, the process proceeds from Step S23 to Step S24→Step S25→Step S26. In Step S25, the parking travel is started, and in Step S26 it is determined whether the vehicle is stopped in the parking area. If the vehicle is not stopped in the parking area, the flow that progresses from Step S25→Step S26 is repeated, and if it is determined that the vehicle is stopped in the parking area, the process proceeds to Step S27. In Step S27, the park lock command is output to the PBW controller 33.

Therefore, when the parking travel is started by means of the automatic parking control and the host vehicle is stopped in the parking area by means of the parking travel, the park lock command is output from the automatic parking control unit 32c to the PBW controller 33. In the PBW controller 33, by outputting the park lock execution command based on the park lock command to the park actuator 71, the parking pawl 77 engages with the parking gear 78, thereby entering the park lock state.

When the confirmed failure flag bFAIL or the temporary failure determination flag bTMPFAIL is set to "1" in the failure diagnostic process of the park-by-wire system A shown in FIG. 3, the fail-safe control by means of an interrupt is started. At this time, the interrupt process permitted region is set to the period during the automatic parking control from prior to the determination that the manned/unmanned automatic parking mode start has been selected in Step S21 until the time that the park lock command is output in Step S27.

If bFAIL=1 is set and the interrupt is started during travel, the process proceeds from Step S31 to Step S32→Step S33→Step S34→Step S35→Step S38→END. If bFAIL=1 is set and the interrupt is started while the vehicle is stopped, the process proceeds from Step S31 to Step S32→Step S34→Step S35→Step S38→END.

Therefore, if there is an interrupt due to the setting of bFAIL=1 before the start of control in the manned/unmanned automatic parking mode, the starting of the manned/unmanned automatic parking control is prohibited. On the other hand, if there is an interrupt due to the setting of bFAIL=1 after the start of control in the manned/unmanned automatic parking mode but before the park lock command is output, the control state of manned/unmanned automatic parking control while the vehicle is stopped is turned off.

If bTMPFAIL=1 is set and the interrupt is started during travel, the process proceeds from Step S31 to Step S32→Step S33→Step S34→Step S35→Step S36→Step S37→Step S38→END. If bTMPFAIL=1 is set and the interrupt is started while the vehicle is stopped, the process proceeds from Step S31 to Step S32→Step S34→Step S35→Step S36→Step S37→Step S38→END.

Therefore, if there is an interrupt due to the setting of bTMPFAIL=1 before the start of control in the manned/unmanned automatic parking mode, the starting of the manned/unmanned automatic parking control is prohibited. On the other hand, if there is an interrupt due to the setting of bTMPFAIL=1 after the start of control in the manned/unmanned automatic parking mode but before the park lock command is output, the control state of manned/unmanned automatic parking control while the vehicle is stopped is turned off.

Action of the Automatic Parking Control

First, the prior art of automatic parking control in vehicles equipped with the park-by-wire system that automatically engages park lock once automatic parking has been completed at the target stopping position will be described.

When carrying out the control to stop the vehicle at the target stopping position by means of the automatic parking control, the driver realizes that park lock will be automatically engaged once automatic parking has been completed. The fact that the driver realizes that the park lock is automatically engaged due to the driver's preconception in this manner is of utmost importance. Because of the driver's realization, if the automatic parking is completed in a state in which there is an abnormality or a failure of the function to automatically engage the park lock, the driver does not notice the state in which the park lock is not engaged, even though the park lock has not been automatically engaged. Therefore, if the driver suddenly touches the accelerator pedal or if the driver alights from the vehicle in an inclined parking area, the vehicle may start to move.

A situation in which the vehicle moves to the target stopping position and the park lock cannot be engaged due to a failure state in which the park lock cannot be engaged after automatic parking has been completed is the same as in a fully automatic parking function that calls out a parked vehicle by means of an unmanned operation. That is, there is the possibility that the vehicle is called out by means of unmanned driving even though the park lock cannot be engaged at the final target stopping position.

In contrast, in the first embodiment, failures in which the park lock cannot be engaged are constantly monitored during the failure diagnostic process of the park-by-wire system A shown in FIG. 3. In the automatic parking control process shown in FIG. 4, an interrupt is permitted from any processing position within the dotted frame of FIG. 4. For this reason, the following fail-safe control is achieved.

(A) If a confirmed failure in which the park lock cannot be engaged is diagnosed (bFAIL=1) or it is diagnosed that there is the possibility that failure could occur in which the park lock cannot be engaged (bTMPFAIL=1) before automatic parking control is started, automatic parking control is prohibited.

(B) If a confirmed failure in which the park lock cannot be engaged is diagnosed (bFAIL=1) or it is diagnosed that there is the possibility that failure could occur in which the park lock cannot be engaged (bTMPFAIL=1), during the automatic parking control, the vehicle is braked and stopped, and the automatic parking control is stopped. At this time, it is also possible to set to an N range position in order to avoid transmission of drive power. In addition, in a system with an automatic parking brake function, it is also possible to pull the parking brake automatically.

(C) Likewise, at the time of the unmanned automatic parking area parking control or automatic parking area exiting control (control to call out the vehicle from the parking area), if there is the possibility that the vehicle cannot be ultimately stopped and handed over to the driver in the park lock state, automatic parking control is not started.

By adoption of such a fail-safe control configuration, it is possible to solve the problem that occurs when automatic parking control is canceled in the middle of the automatic parking control while in a state in which the park lock cannot be engaged. That is, it is possible to prevent the occurrence of a situation in which even though the park lock is not engaged, the driver assumes that park lock engagement has been completed and touches the accelerator pedal, thereby suddenly starting the vehicle. Regarding the movement of the vehicle from the target stopping position, cases in which the target parking/stopping area is inclined are conceivable. That is, when the vehicle is stopped at a target stopping position on an inclined road without the park lock engaged and left to an operation by the driver, if the driver alights from the vehicle or the driver is not on board, there is the possibility that the vehicle will start to move on the inclined road. If the fail-safe control is configured as a post-action measure after the failure that the park lock cannot be engaged after reaching the target stopping position is detected, the vehicle would be permitted to start moving after reaching the target stopping position until the post-action measure is executed.

Characteristic Action of the Automatic Parking Control

In the first embodiment, it is determined whether a system abnormality would occur, in which the park-by-wire system A does not operate normally during the automatic parking control. If it is determined before the automatic parking control is started that a system abnormality would occur, the starting of the automatic parking control is not permitted.

That is, fail-safe control is carried out in which the starting of the automatic parking control is not permitted based on the determination of the occurrence of the system abnormality. Thus, when the occurrence of a system abnormality is determined before automatic parking control is started, the automatic parking control can be prevented from being interrupted before its completion due to the abnormality.

In the first embodiment, if the system abnormality is a temporary failure that would be resolved with the passage of time, the starting of the automatic parking control is permitted after the temporary failure is resolved.

That is, temporary failures that would be resolved with the passage of time are treated separately from confirmed failures that would not be resolved with the passage of time, and, in the case of temporary failures, there is left a way to restore the system to normal when the temporary failure is resolved. Accordingly, if the system abnormality is a temporary failure that would be resolved with the passage of time, it becomes possible to restart the automatic parking control even if the automatic parking control is temporarily placed on standby.

In the first embodiment, the system abnormality is a failure in which the park-by-wire system A cannot engage the park lock. If the occurrence of a failure in which the park lock cannot be engaged is determined before the automatic parking control is started, starting of the automatic parking control is prohibited.

For example, if the automatic parking control is started at the time of a failure in which the park lock cannot be engaged, the driver assumes that the park lock was automatically engaged at the time of completion of the automatic parking control. As a result, if the driver unintentionally touches the accelerator pedal at the target stopping position or the target stopping position that has been set is on a gradient, the vehicle may start to move from the target stopping position. In contrast, if the occurrence of a failure in which the park lock cannot be engaged is determined, starting of the automatic parking control itself is prohibited. Thus, when a failure in which the park lock cannot be engaged occurs, it is possible to prevent the vehicle from starting to move from the target stopping position.

In the first embodiment, if the occurrence of a failure is determined after the automatic parking control is started and before the automatic parking has been completed, a stop holding state by means of braking stop is confirmed, after which the automatic parking control is turned off.

For example, if the occurrence of a failure is determined during the automatic parking control, the vehicle could move from the position where the occurrence of the failure is determined due to coasting if the automatic parking control is immediately turned off. In contrast, in the present embodiment, the stop holding state by means of braking stop is confirmed, after which the automatic parking control is turned off. Thus, if the occurrence of a failure is determined during the automatic parking control, the automatic parking control is turned off in a safe state in which the vehicle is stopped at the position where the occurrence of the failure is determined.

In the first embodiment, the automatic parking control has a control function for carrying out automatic parking control by means of unmanned travel and for automatically engaging the park lock when the automatic parking has been completed at the target stopping position. If the occurrence of a failure in which the park lock cannot be engaged is determined before the automatic parking control by means of unmanned travel is started, starting of the automatic parking control by means of unmanned travel is prohibited.

That is, even when automatic parking control by means of unmanned travel is carried out, the driver assumes that the park lock was automatically engaged at the time of completion of the automatic parking control. Therefore, if the target stopping position that was set is on a gradient, there is the possibility that the unmanned vehicle, for which a prompt braking operation cannot be expected, starts to accidentally move. In contrast, if the occurrence of a failure in which the park lock cannot be engaged is determined, starting of the automatic parking control by means of unmanned travel itself is prohibited. Accordingly, when a failure in which the park lock cannot be engaged occurs, it is possible to prevent the vehicle from starting to move from the target stopping position in the automatic parking control by means of unmanned travel.

The effects are described next. The following effects can be obtained with the automatic parking control method and the automatic parking control device for an FF hybrid vehicle according to the first embodiment.

(1) A park-by-wire system A is provided in which the park lock is automatically engaged when automatic parking has been completed at the target stopping position by means of the automatic parking control. In this automatic parking control method for a vehicle (FF hybrid vehicle), it is determined whether a system abnormality would occur in which the park-by-wire system A does not operate normally during automatic parking control. If it is determined before the automatic parking control is started that a system abnormality would occur, the starting of the automatic parking control is not permitted (FIG. 4). Therefore, it is possible to provide the automatic parking control method for a vehicle (FF hybrid vehicle) that prevents the automatic parking control from being interrupted before its completion due to an abnormality when the occurrence of a system abnormality is determined before the automatic parking control is started.

(2) If the system abnormality is a temporary failure that would be resolved with the passage of time, the starting of the automatic parking control is permitted after the temporary failure is resolved (S14 in FIG. 3). Therefore, in addition to the effect of (1), if the system abnormality is a temporary failure that would be resolved with the passage of time, it becomes possible to restart the automatic parking control even if the automatic parking control is temporarily placed on standby.

(3) A system abnormality is a failure in which the park-by-wire system A cannot engage the park lock. If the occurrence of a failure in which the park lock cannot be engaged is determined before the automatic parking control is started, starting of the automatic parking control is prohibited (FIG. 4). Therefore, in addition to the effect of (1) or (2), when a failure in which the park lock cannot be engaged occurs, it is possible to prevent the vehicle from starting to move from the target stopping position.

(4) If the occurrence of a failure is determined after the automatic parking control is started and before the automatic parking has been completed, a stop holding state by means of braking stop is confirmed, after which the automatic parking control is turned off (FIG. 4). Therefore, in addition to the effect of (3), if the occurrence of a failure is determined during the automatic parking control, automatic parking control is turned off in a safe state in which the vehicle is stopped at the position where the failure occurrence is determined.

(5) The automatic parking control has a control function for carrying out automatic parking control by means of unmanned travel and for automatically engaging park lock when automatic parking has been completed at the target stopping position. If the occurrence of a failure in which the park lock cannot be engaged is determined before the automatic parking control by means of unmanned travel is started, the starting of the automatic parking control by means of unmanned travel is prohibited (FIG. 4). Therefore, in addition to the effects of (1) to (4), when a failure in which the park lock cannot be engaged occurs, it is possible to prevent the vehicle from starting to move from the target stopping position in the automatic parking control by means of unmanned travel.

(6) An automatic parking controller (automatic parking control unit 33c) that carries out automatic parking control and a park-by-wire controller (PBW controller 33) that is included in the park-by-wire system A, in which the park lock is automatically engaged when automatic parking has been completed at the target stopping position by means of the automatic parking control, are provided. In the automatic parking control device for a vehicle (FF hybrid vehicle), the park-by-wire controller (PBW controller 33) has a failure diagnostic processing unit (FIG. 3) that determines whether a system abnormality would occur, in which the park-by-wire system A does not operate normally during automatic parking control. The automatic parking controller (automatic parking control unit 33c) has a fail-safe control processing unit (S31 to S38 in FIG. 4) that does not permit the starting of the automatic parking control if it is determined before the automatic parking control is started that a system abnormality would occur. Therefore, it is possible to provide automatic parking control device for a vehicle (FF hybrid vehicle) wherein, when the occurrence of a system abnormality is determined before automatic parking control is started, the automatic parking control can be prevented from being interrupted before its completion due to the abnormality.

The automatic parking control method and the automatic parking control device according to the present disclosure have been described above based on the first embodiment. However, specific configurations are not limited to this first embodiment, and various modifications and additions to the design can be made without departing from the scope of the invention according to each claim of the Claims.

In the first embodiment, an example was presented in which the PBW controller 33 has the fail-safe control processing unit and the automatic parking control unit 33c has the automatic parking control processing unit including the fail-safe control. However, the fail-safe control processing unit and the automatic parking control processing unit including the fail-safe control may both be assigned to one automatic parking controller.

In the first embodiment, an example was presented in which automatic parking control by means of manned travel and automatic parking control by means of unmanned travel are carried out by the automatic parking control unit 33c. However, the automatic parking control unit may carry out only automatic parking area parking control by means of manned travel, or may carry out automatic parking area parking control and automatic parking area exiting control by means of manned travel.

In the first embodiment, an example was presented in which the automatic parking control method and the automatic parking control device according to the present disclosure are applied to an FF hybrid vehicle provided with the automatic parking control unit as one driving assistance control. However, the automatic parking control method and the automatic parking control device according to the present disclosure are not limited to an FF hybrid vehicle, and may be applied to a hybrid vehicle, an electric vehicle, or an engine vehicle having various driving modes. In short, the present invention can be applied to any vehicle equipped with the park-by-wire system in which park lock is automatically engaged once automatic parking is completed at the target stopping position by means of the automatic parking control.

The invention claimed is:

1. An automatic parking control method for a vehicle provided with a park-by-wire system in which a park lock is automatically engaged when automatic parking is completed at a target stopping position using an automatic parking control, the park lock being carried out by engaging a parking pawl with a parking gear provided on a final reduction gear or a transmission output shaft, the automatic parking control method comprising:
   determining whether a system abnormality would occur in which the park-by-wire system does not operate normally during the automatic parking control by monitoring at least one of a motor voltage and a motor current that are applied to a motor of the vehicle, and then comparing the at least one of the motor voltage and the motor current to a predetermined threshold, the system abnormality including a temporary failure that would be resolved over a passage of time, and
   prohibiting starting of the automatic parking control upon determining the system abnormality would occur before the automatic parking control,
   upon determining the existence of the temporary failure that would be resolved over a passage of time, the starting of the automatic parking control is permitted after the temporary failure is resolved.

2. The automatic parking control method according to claim 1, wherein
   the system abnormality further includes a failure in which the park-by-wire system cannot engage the park lock occurring when a non-temporary failure cannot be resolved over the passage of time, and
   the starting of the automatic parking control is prohibited upon determining an occurrence of the failure in which the park lock cannot be engaged before the automatic parking control is started.

3. The automatic parking control method according to claim 2, wherein
   the automatic parking control is turned off after confirming a stop holding state due to a braking stop upon determining the occurrence of the failure after the automatic parking control is started and before the automatic parking is completed.

4. The automatic parking control method according to claim 1, wherein
   the automatic parking control has a control function for executing automatic parking control by using unmanned travel and automatic engagement of park lock when the automatic parking is completed at the target stopping position, and
   the starting of the automatic parking control using the unmanned travel is prohibited upon determining an occurrence of a failure in which it is determined that the park lock cannot be engaged before the automatic parking control is started using the unmanned travel, occurring when a non-temporary failure cannot be resolved over the passage of time.

5. An automatic parking control device for a vehicle, the automatic parking control device comprising:
   an automatic parking controller that carries out automatic parking control; and
   a park-by-wire controller included in a park-by-wire system in which a park lock is automatically engaged when automatic parking is completed at a target stopping position by means of the automatic parking control, the park lock being carried out by engaging a parking pawl with a parking gear provided on a final reduction gear or a transmission output shaft,
   the park-by-wire controller including a failure diagnostic processing unit that determines whether a system abnormality would occur, in which the park-by-wire system would not operate normally during the automatic parking control, the system abnormality including a temporary failure that would be resolved over a passage of time, the failure diagnostic processing unit being configured to monitor at least one of a motor voltage and a motor current that are applied to a motor of the vehicle, the failure diagnostic processing unit being further configured to compare the at least one of the motor voltage and the motor current to a predetermined threshold to determine the existence of the temporary failure, and the automatic parking controller including a fail-safe control processing unit that prohibits the starting of the automatic parking control upon determining that the system abnormality that is the temporary failure would occur before the automatic parking control is started, the starting of the automatic parking control is permitted after the temporary failure is resolved.

* * * * *